United States Patent
De et al.

(10) Patent No.: US 10,273,791 B2
(45) Date of Patent: Apr. 30, 2019

(54) CONTROL SYSTEM FOR A $CO_2$ FRACKING SYSTEM AND RELATED SYSTEM AND METHOD

(71) Applicant: General Electric Company

(72) Inventors: Anindya Kanti De, Bangalore (IN); David Henry Doerge, Delanson, NY (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 412 days.

(21) Appl. No.: 15/293,974

(22) Filed: Oct. 14, 2016

(65) Prior Publication Data

US 2017/0122089 A1    May 4, 2017

(30) Foreign Application Priority Data

Nov. 2, 2015 (IN) ............................ 5927/CHE/2015

(51) Int. Cl.
*E21B 43/16* (2006.01)
*E21B 43/26* (2006.01)
*G05D 7/06* (2006.01)

(52) U.S. Cl.
CPC ............ *E21B 43/26* (2013.01); *E21B 43/164* (2013.01); *G05D 7/0635* (2013.01)

(58) Field of Classification Search
CPC ...... E21B 43/164; E21B 43/26; G05D 7/0635
See application file for complete search history.

(56) References Cited

U.S. PATENT DOCUMENTS 3,090,439 A    5/1963   Copland et al.
3,301,323 A    1/1967   Parsons
(Continued)

FOREIGN PATENT DOCUMENTS

CN    103163856 A    6/2013
WO    2014060722 A2   4/2014

OTHER PUBLICATIONS

Kouame et al., "High resolution processing techniques for ultrasound Doppler velocimetry in the presence of colored noise. II. Multiplephase pipe-flow velocity measurement", Ultrasonics, Ferroelectrics, and Frequency Control, IEEE Transactions on, vol. 50, Issue: 3, pp. 267-278, Mar. 2003.

(Continued)

*Primary Examiner* — Daniel P Stephenson
(74) *Attorney, Agent, or Firm* — GE Global Patent Operation (57) ABSTRACT

A control system for a $CO_2$ fracking system includes a phase detector, a control valve, and a controller. The phase detector is disposed proximate to at least one of an inlet conduit and an outlet conduit of a fracking component. The control valve is fluidly coupled to the inlet conduit. The controller is communicatively coupled to the phase detector, the control valve, and the fracking component. The phase detector is configured to determine $CO_2$ phase in at least one of a $CO_2$ stream incoming into the fracking component and $CO_2$ phase discharged from the fracking component, and to generate an input signal based on the phase. The controller is configured to control one or both of a flow of the incoming $CO_2$ stream into the fracking component via the control valve and an operation condition of the fracking component, based on the input signal received from the phase detector.

22 Claims, 3 Drawing Sheets

(56) References Cited

U.S. PATENT DOCUMENTS

| | | | |
|---|---|---|---|
| 3,842,910 A * | 10/1974 | Zingg | E21B 43/26 166/308.1 |
| 4,374,545 A * | 2/1983 | Bullen | B62B 1/18 166/177.5 |
| 4,609,043 A | 9/1986 | Cullick | |
| 4,617,997 A | 10/1986 | Jennings, Jr. | |
| RE32,302 E * | 12/1986 | Almond | C09K 8/703 166/308.6 |
| 5,558,160 A * | 9/1996 | Tudor | C09K 8/62 166/177.5 |
| 6,102,484 A | 8/2000 | Young, III | |
| 6,609,895 B2 | 8/2003 | Forthuber et al. | |
| 6,725,878 B1 | 4/2004 | Nawa et al. | |
| 6,758,100 B2 | 7/2004 | Huang | |
| 6,988,547 B2 | 1/2006 | Goodwin et al. | |
| 7,516,793 B2 | 4/2009 | Dykstra | |
| 7,673,525 B2 | 3/2010 | Huang | |
| 7,845,413 B2 | 12/2010 | Shampine et al. | |
| 7,921,914 B2 | 4/2011 | Bruins et al. | |
| 8,146,665 B2 | 4/2012 | Neal | |
| 8,455,402 B2 | 6/2013 | Watkins et al. | |
| 8,874,382 B2 | 10/2014 | Verma et al. | |
| 8,936,074 B2 | 1/2015 | Kim et al. | |
| 2005/0229716 A1 | 10/2005 | Unsworth et al. | |
| 2010/0145634 A1 * | 6/2010 | Pinguet | G01F 1/46 702/45 |
| 2011/0040501 A1 * | 2/2011 | Martin | E21B 47/10 702/45 |
| 2011/0259581 A1 * | 10/2011 | Bedouet | E21B 49/005 166/250.03 |
| 2012/0018167 A1 * | 1/2012 | Konopczynski | E21B 43/14 166/369 |
| 2012/0067568 A1 * | 3/2012 | Palmer | E21B 36/02 166/256 |
| 2012/0255734 A1 | 10/2012 | Coli et al. | |
| 2013/0118739 A1 | 5/2013 | Collins | |
| 2013/0233542 A1 | 9/2013 | Shampine et al. | |
| 2014/0124208 A1 | 5/2014 | Loree et al. | |
| 2014/0151050 A1 | 6/2014 | Sanders et al. | |
| 2014/0151051 A1 * | 6/2014 | Lissianski | E21B 43/267 166/308.1 |
| 2014/0257577 A1 | 9/2014 | Prange et al. | |
| 2015/0175878 A1 * | 6/2015 | Kelly | C09K 8/68 166/177.5 |
| 2016/0312107 A1 * | 10/2016 | Leon | C09K 8/62 |
| 2016/0340278 A1 * | 11/2016 | Olah | E21B 43/267 |
| 2017/0122089 A1 * | 5/2017 | De | E21B 43/164 |

OTHER PUBLICATIONS

Morriss et al., "Ultrasonic Imaging and Velocimetry in Two-Phase Pipe Flow", Journal of Energy Resources Technology, vol. 115, Issue 2, p. 108, 1993.

* cited by examiner

CONTROL SYSTEM FOR A $CO_2$ FRACKING SYSTEM AND RELATED SYSTEM AND METHOD

BACKGROUND

The present disclosure relates to $CO_2$ fracking systems, and more particularly to control systems and methods of controlling the $CO_2$ fracking systems.

Fracking systems, such as, a $CO_2$ fracking system typically include supplying a pressurized $CO_2$ stream into formations so as to force and extract oil or gas from such formations. During operation, it may be desirable to know a phase of a $CO_2$ stream flowing in the $CO_2$ fracking system, because an undesired phase of the $CO_2$ stream may affect an overall performance of the $CO_2$ fracking system. The conventional $CO_2$ fracking system includes relief valves configured to discharge plumes of the $CO_2$ stream during one or more operation stages of the $CO_2$ fracking system. Currently, the phase of the $CO_2$ stream is monitored manually by observing the $CO_2$ plumes discharged from such relief valves. Upon detection of the undesired phase of the $CO_2$ stream during any particular operation stage of the $CO_2$ fracking system, one or more valves disposed in the $CO_2$ fracking systems are manually closed or opened to control a flow of the $CO_2$ stream. Typically, such work environments are hazardous in nature, thereby causing health injuries to operators employed to manually operate the valves. Further, such conventional $CO_2$ fracking system may result in loss of the $CO_2$ stream via the plumes discharged from the relief valves.

Accordingly, there is a need for an improved control system for a $CO_2$ fracking system, and an associated method for monitoring a phase of a $CO_2$ stream thereby controlling the $CO_2$ fracking system.

BRIEF DESCRIPTION

In accordance with one aspect of the present description, a control system for a $CO_2$ fracking system is disclosed. The $CO_2$ fracking system includes a fracking component. The control system includes a phase detector, a control valve, and a controller. The phase detector is disposed proximate to at least one of an inlet conduit and an outlet conduit of the fracking component. The control valve is fluidly coupled to the inlet conduit of the fracking component. The controller is communicatively coupled to the phase detector, the control valve, and the fracking component. The phase detector is configured to determine a phase of $CO_2$ in at least one of a $CO_2$ stream incoming into the fracking component and a $CO_2$ stream discharged from the fracking component, and to generate an input signal based on the determined phase. The controller is configured to control one or both of i) a flow of the incoming $CO_2$ stream into the fracking component via the control valve and ii) an operation condition of the fracking component, based on the input signal received from the phase detector.

In accordance with another aspect of the present description, a $CO_2$ fracking system is disclosed. The $CO_2$ fracking system includes a storage vessel, a booster pump, a fracking pump, and a control system. The storage vessel is fluidly coupled to a $CO_2$ source through a first conduit. The booster pump is fluidly coupled to the storage vessel through a second conduit. The fracking pump is fluidly coupled to the booster pump via a third conduit and to a wellhead via a fourth conduit. The control system is configured to control the $CO_2$ fracking system. The control system includes a phase detector, a control valve, and a controller. The phase detector is disposed proximate to at least one of an inlet conduit and an outlet conduit of the fracking component. The control valve is fluidly coupled to the inlet conduit of the fracking component. The controller is communicatively coupled to the phase detector, the control valve, and the fracking component. The phase detector is configured to determine a phase of $CO_2$ in at least one of a $CO_2$ stream incoming into the fracking component and a $CO_2$ stream discharged from the fracking component, and to generate an input signal based on the determined phase. The controller is configured to control one or both of i) a flow of the incoming $CO_2$ stream into the fracking component via the control valve and ii) an operation condition of the fracking component, based on the input signal received from the phase detector.

In accordance with yet another aspect of the present description, a method of controlling a $CO_2$ fracking system including a fracking component is disclosed. The method includes determining a phase of $CO_2$ in at least one of a $CO_2$ stream incoming into a fracking component of a $CO_2$ fracking system and a $CO_2$ stream discharged from the fracking component. The method further includes generating an input signal representative of the $CO_2$ phase, where the determining and generating steps are performed by a phase detector disposed proximate to at least one of an inlet conduit and an outlet conduit of the fracking component. Further, the method includes controlling one or both of i) a flow of an incoming $CO_2$ stream into the fracking component via a control valve fluidly coupled to the fracking component and ii) an operation condition of the fracking component, based on the input signal received from the phase detector, where the controlling step is performed by a controller communicatively coupled to the phase detector, the control valve, and the fracking component.

DRAWINGS

These and other features and aspects of embodiments of the present technique will become better understood when the following detailed description is read with reference to the accompanying drawings in which like characters represent like parts throughout the drawings, wherein.

DETAILED DESCRIPTION

In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value.

Unless defined otherwise, technical and scientific terms used herein have the same meaning as is commonly understood by one of skill in the art to which this description belongs. The terms "comprising," "including," and "having" are intended to be inclusive, and mean that there may be additional elements other than the listed elements. The terms "first", "second", and the like, as used herein do not denote any order, quantity, or importance, but rather are used to distinguish one element from another. In the following specification and the claims that follow, the singular forms "a", "an" and "the" include plural referents unless the context clearly dictates otherwise.

In one embodiment, a control system for a $CO_2$ fracking system is presented. In some embodiments, the $CO_2$ fracking system is a topside fracking system configured to supply a pressurized $CO_2$ stream into formations for extracting oil or gas from such formations. In some embodiments, the formations may include a hydrocarbon reservoir having at least one of oil and gas. The topside fracking system includes at least one of a fracking component, an inlet conduit of such a fracking component, an outlet conduit of such a fracking component, wherein the inlet and outlet conduits are utilized for one or both of pressurizing and transporting the pressurized $CO_2$ into the formations through a wellhead.

In some embodiments, the control system includes a phase detector disposed proximate to at least one of an inlet conduit and an outlet conduit of the fracking component. The control system further includes a control valve fluidly coupled to the inlet conduit of the fracking component. Further, the control system includes a controller communicatively coupled to the phase detector, the control valve, and the fracking component. The phase detector is configured to determine a phase of $CO_2$ in at least one of a $CO_2$ stream incoming into the fracking component and a $CO_2$ stream discharged from the fracking component, and to generate an input signal based on the determined phase. The term "phase" as used in this context means one or more of a liquid $CO_2$, a gaseous $CO_2$, and a solid $CO_2$. The controller is configured to control one or both of i) a flow of the incoming $CO_2$ stream into the fracking component via the control valve and ii) an operation condition of the fracking component, based on the input signal received from the phase detector.

Figure 1:
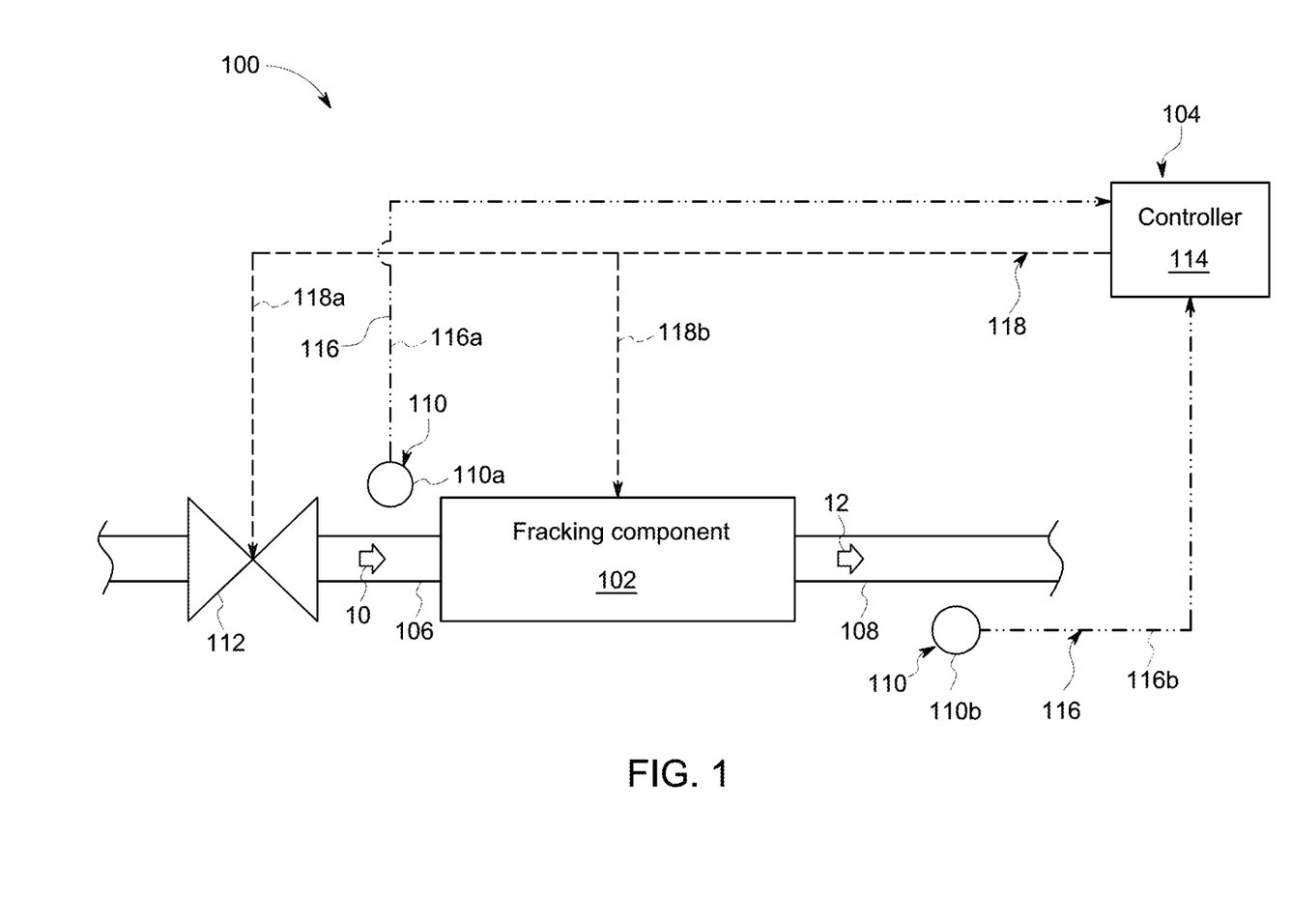
FIG. 1 is a block diagram of a $CO_2$ fracking system including a control system and a fracking component, in accordance with one embodiment.

FIG. 1 illustrates a block diagram of a $CO_2$ fracking system 100 according to one embodiment of the description.

The $CO_2$ fracking system 100 includes a fracking component 102 and a control system 104. The $CO_2$ fracking system 100 further includes an inlet conduit 106 configured to supply an incoming $CO_2$ stream 10 into the fracking component 102 and an outlet conduit 108 configured to discharge a $CO_2$ stream 12 from the fracking component 102. In one embodiment, the $CO_2$ stream 10 includes at least one of a gaseous $CO_2$ phase and a liquid $CO_2$ phase. In certain embodiments, the fracking component 102 is communicatively coupled to a controller 114 of the control system 104 and is configured to receive a control signal from the controller. The controller 114 is explained in greater detail below. In one embodiment, the fracking component 102 includes at least one of a storage vessel, a booster pump, and a fracking pump. In some embodiments, the fracking component 102 may further include a liquid gas separator and a blender. The configuration of each of these fracking components are discussed in greater detail in the embodiment illustrated in FIG. 2.

In one embodiment, the fracking component 102 is a storage vessel that is configured to receive the $CO_2$ stream 10 from a $CO_2$ source (not shown in FIG. 1). In some embodiments, the storage vessel is configured to temporarily store the received $CO_2$ stream 10, separate the gaseous $CO_2$ phase from a liquid $CO_2$ phase, and discharge the $CO_2$ stream 12 including the liquid or the gaseous $CO_2$ phases to a downstream fracking component, such as, the booster pump, depending on the operation stage of the $CO_2$ fracking system 100. In some embodiments, the storage vessel may be coupled to a liquid gas separator which may be configured to separate the gaseous $CO_2$ phase from the liquid $CO_2$ phase. In such embodiments, the booster pump may be coupled to the liquid gas separator and may be configured to receive either the gaseous $CO_2$ phase or the liquid $CO_2$ phase, depending upon the operation stage and operation condition of the $CO_2$ fracking system 100. In some embodiments, a temperature of the $CO_2$ stream 10 is in a range from about −12 degrees Celsius to −24 degrees Celsius, for example, 0 degree Celsius, and pressure of the $CO_2$ stream 10 is in a range from about 200 psi to about 400 psi, for example, about 300 psi.

In one embodiment, the fracking component 102 is a booster pump that is configured to receive the $CO_2$ stream 10 including the liquid $CO_2$ phase, from a previous fracking component, such as, a storage vessel. In such embodiments, the booster pump is configured to increase the pressure of the received $CO_2$ stream 10 so as to maintain the pressure at about 300 psi and discharge the $CO_2$ stream 12 to a downstream fracking component, such as, the fracking pump. In some other embodiments, the booster pump may be configured to receive the $CO_2$ stream 10 including the gaseous $CO_2$ phase depending on the operation stage of the $CO_2$ fracking system 100. In some embodiments, the booster pump may be coupled to a blender which may be configured to i) receive the liquid $CO_2$ phase and a proppant, and ii) mix the liquid $CO_2$ phase with the proppant to generate a mixture of liquid $CO_2$ and proppant. In such embodiments, the proppant may be obtained from a proppant source. In some embodiments, the proppant may be added with other chemicals or additives so as to improve proppant transport, increase viscosity of the $CO_2$, reduce fluid friction, prevent scaling, and address wellbore and downhole behavior. In such embodiments, the blender may maintain a pressure of the mixture of liquid $CO_2$ and proppant in a range from about 200 psi to about 250 psi.

In one embodiment, the fracking component 102 is a fracking pump that is configured to receive the $CO_2$ stream 10 including the liquid $CO_2$ phase, from a previous fracking component, such as, the booster pump. In such embodiments, the fracking pump is configured to increase the pressure of the $CO_2$ stream 10 in a range from 8000 psi to about 12000 psi, such as, 10000 psi and discharge a pressurized $CO_2$ stream 12 to a wellhead (not shown in FIG. 1). In some other embodiments, the fracking pump may be configured to receive the $CO_2$ stream 10 including the gaseous $CO_2$ phase depending on the operation stage of the $CO_2$ fracking system 100. In some embodiments, the fracking pump may be further coupled to the blender and configured to receive the mixture of liquid $CO_2$ and proppant and increase the pressure of the mixture in a range from 8000 psi to about 12000 psi, such as, 10000 psi and discharge a pressurized mixture to a wellhead (not shown in FIG. 1).

The control system 104 includes a phase detector 110, a control valve 112, and a controller 114, as shown in FIG. 1. In one embodiment, the phase detector 110 is disposed proximate to at least one of the inlet conduit 106 and the outlet conduit 108 of the fracking component 102. In certain embodiments, the phase detector 110 includes a first phase detector 110a disposed proximate to the inlet conduit 106 and a second phase detector 110b disposed proximate to the outlet conduit 108. The term "proximate" as used in this context means that the phase detector is disposed either in direct contact with or very close to a portion of the inlet conduit 106 that is near an inlet of the fracking component 102 or to a portion of the outlet conduit 108 that is near an outlet of the fracking component 102. In certain embodiments, the term "proximate" as used in this context means that the phase detector is non-intrusively positioned near the inlet or outlet conduits 106, 108 of the fracking component 102.

In some embodiments, the phase detector 110 may be a non-intrusive phase detector disposed proximate to one or both of the inlet and outlet conduits 106, 108. In some other embodiments, the phase detector 110 may be an intrusive phase detector disposed on one or both of the inlet and outlet conduits 106, 108. In some embodiments, the phase detector 110 includes at least one of an ultrasound transceiver, a microwave detector, an infrared detector, a coriolis detector, and a radio frequency detector.

In certain embodiments, the phase detector 110 is an ultrasound transceiver including a transmitter and a receiver. The phase detector 110 is configured to determine a $CO_2$ phase in at least one of the $CO_2$ stream 10 incoming into the fracking component 102 and a $CO_2$ phase in the $CO_2$ stream 12 discharged from the fracking component 102, and to generate an input signal 116 representative of the determined $CO_2$ phase. In certain embodiments, the first phase detector 110a generates a first input signal 116a representative of the phase of the $CO_2$ in the $CO_2$ stream 10 incoming into the fracking component 102. Similarly, the second phase detector 110b generates a second input signal 116b representative of the phase of the $CO_2$ in the $CO_2$ stream 12 discharged from the fracking component 102. The first and second input signals 116a, 116b are later transmitted to the controller 114. In some embodiments, the signal emitted and received by the ultrasound transceiver may have a signal strength in a range from about 4 milliamps to about 20 milliamps.

The control valve 112 is fluidly coupled to the inlet conduit 106 of the fracking component 102. In certain embodiments, the first phase detector 110a is disposed between the control valve 112 and the fracking component 102. The control valve 112 is configured to control a flow of the $CO_2$ stream 10 incoming into the fracking component 102. The control valve 112 is further communicatively coupled to the controller 114 and is configured to receive a control signal from the controller 114.

The controller 114 is communicatively coupled to the phase detector 110, the control valve 112, and the fracking component 102. In some embodiments, the controller 114 is configured to control one or both of i) a flow of the incoming $CO_2$ stream 10 into the fracking component 102 via the control valve 112 and ii) an operation condition of the fracking component 102, based on the input signal 116 received from the phase detector 110. In some embodiments, the operation condition of the $CO_2$ fracking system 100 includes a start state or a stop state of the fracking component 102.

In some embodiments, the controller 114 is configured to receive the input signal 116 from the phase detector 110 and process the input signal 116 to generate a control signal 118 for controlling one or both of i) the flow of the incoming $CO_2$ stream 10 into the fracking component 102 via the control valve 112 and ii) the operation condition of the fracking component 102. In certain embodiments, the controller 114 is configured to receive the first and second input signals 116a, 116b and process the received signals 116a, 116b to generate a first control signal 118a and a second control signal 118b.

In certain embodiments, the processing of the input signals 116a, 116b by the controller 114 includes mapping the received input signals 116a, 116b with a plurality of signal values stored in an exemplary look-up table (as shown in Table-1 below) to detect the phase of the $CO_2$ stream in at least one of the $CO_2$ stream 10 incoming into the fracking component 102 and the $CO_2$ stream 12 discharged from the fracking component 102.

| Plurality of signal values | | Phase of a $CO_2$ stream |
|---|---|---|
| 4 milliamps | <=10 milliamps | gaseous $CO_2$ phase |
| >10 milliamps | 20 milliamps | liquid $CO_2$ phase |

In some other embodiments, the controller 114 may use a computer model to process the first and second input signals 116a, 116b to detect the phase of the $CO_2$ streams 10, 12. In such embodiments, the computer model may be stored in the memory of the controller 114 and may be executable by a processor disposed in the controller 114. In some other embodiments, experimental results, experimental models, or both may be used for processing the input signals 116a, 116b to detect the phase of the $CO_2$ streams 10, 12.

In some embodiments, the controller 114 includes at least one arithmetic logic unit, a microprocessor, a general purpose controller or a processor array to perform desired computations or run a computer program. Further, the controller 114 may include a memory which is configured to be accessed by the processor, store one or more look-up tables e.g. Table-1, and the input signals 116a, 116b received from the phase detector 110. In some embodiments, the memory may be a non-transitory storage medium, for example, a dynamic random access memory (DRAM) device, a static random access memory (SRAM) device, flash memory and the like. In certain embodiments, a non-transitory computer readable medium (not shown) may be encoded with a computer program to instruct the controller 114 to process the received input signals 116a, 116b and detect the phase of the $CO_2$ streams 10, 12. In certain embodiments, the controller 114 is an electronic control unit (ECU).

In some embodiments, the controller 114 is configured to generate the control signal 118 based on the detected $CO_2$ phase in the $CO_2$ streams 10, 12 for controlling at least one of the control valve 112 and the fracking component 102. In certain embodiments, the controller 114 generates a first control signal 118a to control the control valve 112 and a second control signal 118b to control the fracking component 102.

As mentioned earlier, in one embodiment, the $CO_2$ fracking system 100 is a topside fracking system configured to supply a pressurized $CO_2$ stream into formations (not shown in FIG. 1) for extracting oil or gas from such formations. In some embodiments, the $CO_2$ fracking system 100 operates in a batch process including one or more operating stages, for example, i) a gas pre-cool stage, ii) a liquid-fill stage, iii) an operation stage, and iv) a shutdown stage. The gas pre-cool stage includes feeding a gaseous $CO_2$ phase of the $CO_2$ stream 10, into a fracking component 102 to detect any leakage in the $CO_2$ fracking system 100. The liquid-fill stage includes feeding a liquid $CO_2$ phase of the $CO_2$ stream 10, into the fracking component to purge the gaseous $CO_2$ phase from the $CO_2$ fracking system 100. The operation stage includes continue feeding of the liquid $CO_2$ phase into the fracking component, and changing an operation condition of the fracking component to a start state, thereby increasing pressure of the $CO_2$ stream being supplied to the fracking component. The shutdown stage includes changing the operation condition of the fracking component from the start state to a stop state, and switching the $CO_2$ phase supplied to the $CO_2$ fracking system 100 from the liquid $CO_2$ phase to the gaseous $CO_2$ phase, to purge the liquid $CO_2$ phase from the $CO_2$ fracking system 100.

In some embodiments, during the liquid-fill stage, the phase detector 110 may determine a presence of a gaseous $CO_2$ phase in at least one of the $CO_2$ stream 10 incoming into the fracking component 102 and the $CO_2$ stream 12 discharged from the fracking component 102, and generate the input signal 116 representative of the gaseous $CO_2$ phase. In some such embodiments, the first phase detector 110a is configured to generate the first input signal 116a and the second phase detector 110b is configured to generate the second input signal 116b, and transmit the first and second input signals 116a, 116b to the controller 114. The controller 114 is configured to process the first and second input signals 116a, 116b and generate the first and second control signals 118a, 118b. In one embodiment, the processing step by the controller 114 includes mapping the first and second input signals 116a, 116b with the plurality of signal values stored in the look-up table (as shown in Table-1) to detect the gaseous $CO_2$ phase.

In some embodiments, upon detection of the gaseous $CO_2$ phase, the controller 114 is configured to generate the first and second control signals 118a, 118b to control at least one of the control valve 112 and the fracking component 102. In one embodiment, the controller 114 is configured to perform one or more of (i) continuing the supply of liquid $CO_2$ phase to the fracking component 102 via the incoming $CO_2$ stream 10, (ii) switch to the operation stage of the $CO_2$ fracking system, and (iii) determine whether to connect the fracking component 102 to an alternative liquid $CO_2$ source (not shown in FIG. 1) based on the input signal 116 received from the phase detector 110.

In certain embodiments, the controller 114 is configured to perform one or more of (i) transmit the first control signal 118a to the control valve 112 so as to continue supplying the liquid $CO_2$ phase to the fracking component 102 via the incoming $CO_2$ stream 10, (ii) transmit the second control signal 118b to the fracking component 102 so as to maintain the operation condition of the $CO_2$ fracking component 102 to the stop state, and (iii) determine whether to connect the fracking component 102 to the alternative liquid $CO_2$ source and transmit the first control signal 118a to the control valve 112 to connect the fracking component 102 to the alternative liquid $CO_2$ source if such a determination is made.

In some other embodiments, during the liquid-fill stage, the phase detector 110 may further determine the presence of a liquid $CO_2$ phase in at least one of the $CO_2$ stream 10 incoming into the fracking component 102 and the $CO_2$ stream 12 discharged from the fracking component 102, and generate the input signal 116 representative of the liquid $CO_2$ phase. In some such embodiments, upon detection of the liquid $CO_2$ phase, the controller 114 is configured to transmit the second control signal 118b to the fracking component 102, thereby switching the operation condition of the $CO_2$ fracking component 102 from the stop state to the start state and proceeding to the operation stage of the $CO_2$ fracking system 100.

In some embodiments, during the operation stage, the phase detector 110 may determine a concentration of a gaseous $CO_2$ phase in at least one of the $CO_2$ stream 10 incoming into the fracking component 102 and the $CO_2$ stream 12 discharged from the fracking component 102, and generate the input signal 116 representative of the gaseous $CO_2$ phase. In some such embodiments, the first phase detector 110a is configured to generate the first input signal 116a and the second phase detector 110b is configured to generate the second input signal 116b, and transmit the first and second input signals 116a, 116b to the controller 114.

In some embodiments, the controller 114 is configured to process the first and second input signals 116a, 116b and generate the first and second control signals 118a, 118b. In one embodiment, the processing step by the controller 114 includes mapping the first and second input signals 116a, 116b with the plurality of signal values stored in the look-up table (as shown in Table-1) to detect the gaseous $CO_2$ phase.

In some embodiments, upon detection of the gaseous $CO_2$ phase, the controller 114 is configured to generate the first and second control signals 118a, 118b to control at least one of the control valve 112 and the fracking component 102. In one embodiment, the controller 114 is configured to perform one or both of i) switch the operating condition of the fracking component 102 from the start state to the stop state and ii) determine whether to connect the fracking component 102 to the alternative liquid $CO_2$ source, based on the input signal 116 received from the phase detector 110.

In certain embodiments, the controller 114 is configured to perform one or both of i) transmit the second control signal 118b to the fracking component 102 to switch the operating condition of the fracking component 102 from the start state to the stop state, and ii) determine whether to connect the fracking component 102 to the alternative liquid $CO_2$ source and transmit the first control signal 118a to the control valve 112 to connect the fracking component 102 to the alternative liquid $CO_2$ source if such a determination is made.

In some embodiments, during the shutdown stage, the phase detector 110 may determine a concentration of a liquid $CO_2$ phase in at least one of the $CO_2$ stream 10 incoming into the fracking component 102 and the $CO_2$ stream 12 discharged from the fracking component 102, and generate the input signal 116 representative of the liquid $CO_2$ phase. In such embodiments, the first phase detector 110a is configured to generate the first input signal 116a and the second phase detector 110b is configured to generate the second input signal 116b, and transmit the first and second input signals 116a, 116b to the controller 114.

The controller 114 is configured to process the first and second input signals 116a, 116b and generate the first and second control signals 118a, 118b. In one embodiment, the processing step by the controller 114 includes mapping the first and second input signals 116a, 116b with the plurality of signal values stored in the look-up table (as shown in Table-1) to detect the liquid $CO_2$ phase.

In some embodiments, upon detection of the liquid $CO_2$ phase, the controller 114 is configured to generate the first and second control signals 118a, 118b to control at least one of the control valve 112 and the fracking component 102. In one embodiment, the controller 114 is configured to perform one or both of i) continue supplying gaseous $CO_2$ phase to the fracking component 102 via the incoming $CO_2$ stream 10 and ii) determine whether to connect the fracking component 102 to an alternative gaseous $CO_2$ source based on the input signal 116 received from the phase detector 110.

In certain embodiments, the controller 114 is configured to perform one or both of i) transmit the first control signal 118a to the control valve 112 to supply gaseous $CO_2$ to the fracking component 102 via the incoming $CO_2$ stream 10 and ii) determine whether to connect the fracking component 102 to the alternative gaseous $CO_2$ source (not shown in FIG. 1), and transmit the first control signal 118a to the control valve 112 to connect the fracking component 102 to the alternative gaseous $CO_2$ source. The controller 114 may further transmit the second control signal 118b to the fracking component 102 to switch the operating condition of the fracking component 102 from the start state to the stop state.

In one embodiment, a $CO_2$ fracking system is presented. The $CO_2$ fracking system includes a storage vessel, a booster pump, a fracking pump, and a control system. The storage vessel is fluidly coupled to a $CO_2$ source through a first conduit. The booster pump is fluidly coupled to the storage vessel through a second conduit. The fracking pump is fluidly coupled to the booster pump via a third conduit and to a wellhead via a fourth conduit. The control system is configured to control the $CO_2$ fracking system. The control system includes a phase detector, a control valve, and a controller. The phase detector is disposed proximate to at least one of an inlet conduit and an outlet conduit of the fracking component. The control valve is fluidly coupled to the inlet conduit of the fracking component. The controller is communicatively coupled to the phase detector, the control valve, and the fracking component. The phase detector may be configured to determine a phase of $CO_2$ in at least one of a $CO_2$ stream incoming into the fracking component and a $CO_2$ stream discharged from the fracking component, and to generate an input signal based on the determined phase. The controller is configured to control one or both of i) a flow of the incoming $CO_2$ stream into the fracking component via the control valve and ii) an operation condition of the fracking component, based on the input signal received from the phase detector.

Figure 2:
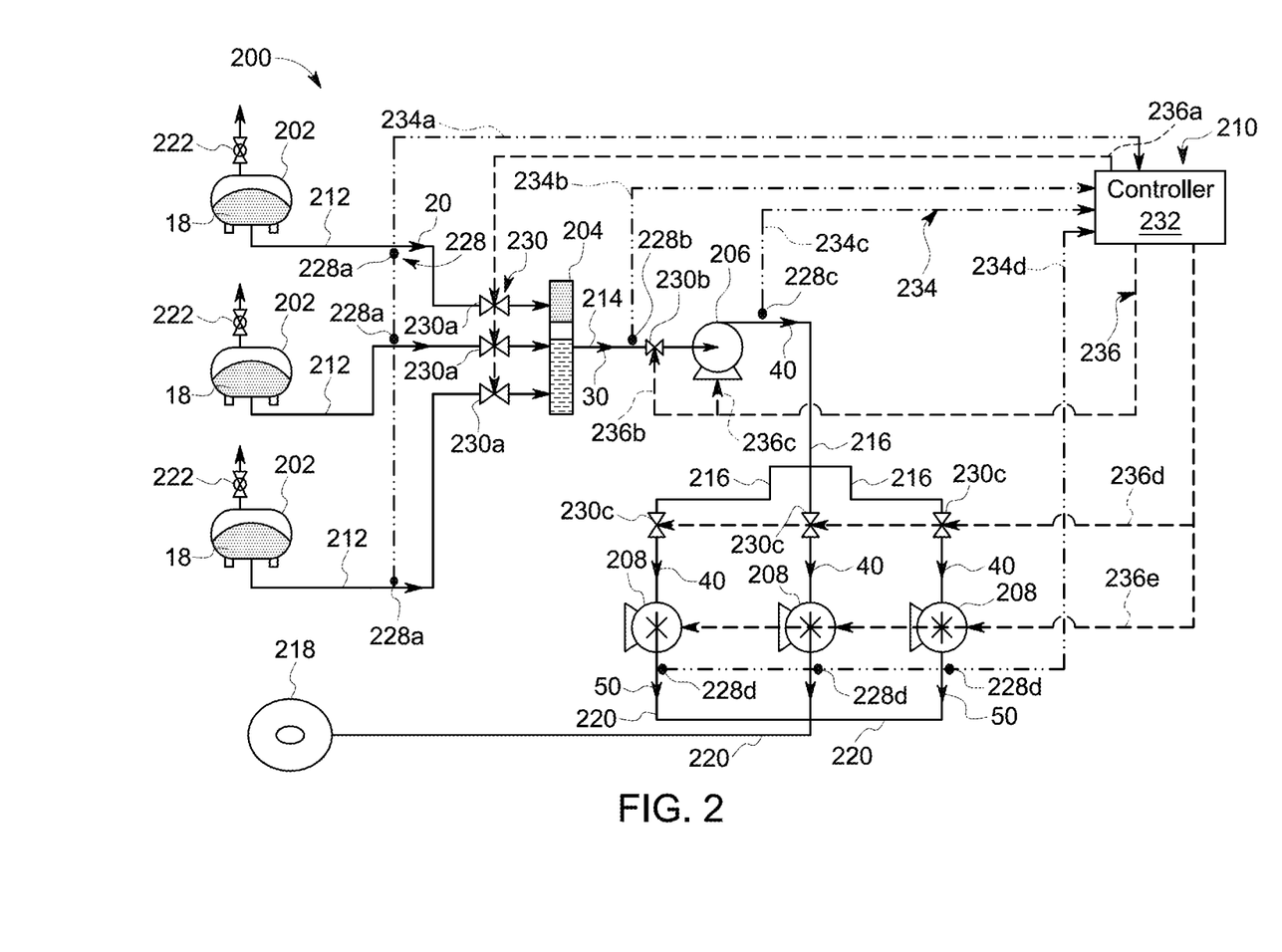
FIG. 2 is a block diagram of a $CO_2$ fracking system including a storage vessel, a booster pump, a fracking pump, and a control system, in accordance with one embodiment.

FIG. 2 is a block diagram of a $CO_2$ fracking system 200 according to one embodiment of the description. In one embodiment, the $CO_2$ fracking system 200 includes a plurality of $CO_2$ sources 202, a storage vessel 204, a booster pump 206, a plurality of fracking pumps 208, and a control system 210. The $CO_2$ fracking system 200 may further include one or more operating stages, for example, i) a gas pre-cool stage, ii) a liquid-fill stage, iii) an operation stage, and iv) a shutdown stage.

In some embodiments, the plurality of $CO_2$ sources 202, for example, a $CO_2$ source is fluidly coupled to the storage vessel 204 through first conduits 212. At least some of the $CO_2$ sources 202 may contain $CO_2$ 18 having at least one of a liquid phase and a gaseous phase. In some embodiments, the plurality of $CO_2$ sources 202 may be refineries and power plants. In some such embodiments, the $CO_2$ 18 may be in the gaseous $CO_2$ phase, which may undergo a series of steps such as removal of impurities and condensation, before being supplied to the storage vessel 204. In one or more embodiments, the $CO_2$ 18 may be obtained by processing of fuels, such as, natural gas, biomass, gasoline, diesel fuel, coal, oil shale, fuel oil, tar sands, and combinations thereof. In the illustrated embodiment, the plurality of $CO_2$ sources 202 includes three $CO_2$ sources 202, however the number and configuration of the sources may vary depending on the application and design criteria. In some embodiments, at least some of the $CO_2$ sources 202 may be a pressurized tank configured to store the pressurized $CO_2$ 18. Each $CO_2$ source 202 may include a relief valve 222 configured to control or limit the pressure of the $CO_2$ 18 in the corresponding $CO_2$ source 202, in some embodiments.

The storage vessel 204 may be a pressurized tank configured to receive a $CO_2$ stream 20 from the plurality of $CO_2$ sources 202 through the first conduits 212. The storage vessel 204 may include a liquid gas separator (not shown in FIG. 2) configured to separate the liquid $CO_2$ phase from the gaseous $CO_2$ phase. In some such embodiments, the liquid $CO_2$ phase may be collected at the bottom of the storage vessel 204 and the gaseous $CO_2$ phase may be collected at the top of the storage vessel 204. In some embodiments, the storage vessel 204 may be coupled to a liquid gas separator (not shown in FIG. 2) which may be configured to separate the gaseous $CO_2$ phase from the liquid $CO_2$ phase. In such embodiments, the booster pump 206 may be coupled to the liquid gas separator and may be configured to receive either the gaseous $CO_2$ phase or the liquid $CO_2$ phase, depending upon the operation stage and operation condition of the $CO_2$ fracking system 200.

In some embodiments, as show in FIG. 2, the booster pump 206 is fluidly coupled to the storage vessel 204 through a second conduit 214. The booster pump 206 is configured to receive the $CO_2$ stream 30 from the storage vessel 204 through the second conduit 214. The $CO_2$ stream 30 supplied to the booster pump 206 may include the gaseous $CO_2$ phase or the liquid $CO_2$ phase depending on an operation state of the $CO_2$ fracking system 200.

In some embodiments, the $CO_2$ stream 30 including the liquid $CO_2$ phase is supplied to the booster pump 206 during the liquid-fill stage and the operation stage of the $CO_2$ fracking system 200. During the operation stage, the booster pump 206 is in a start state, and is configured to increase or maintain the pressure of the $CO_2$ stream 30 to about 300 psi and subsequently feed a first $CO_2$ stream 40 to a downstream component, such as, at least one fracking pump in the plurality of fracking pumps 208. Similarly, during the liquid-fill stage, the booster pump 206 is in a stop state, and is configured to allow a flow of the liquid $CO_2$ phase of the first $CO_2$ stream 40 to at least one fracking pump in the plurality of fracking pumps 208 via the plurality of third conduits 216. In some embodiments, the $CO_2$ fracking system 200 may include a plurality of booster pumps 206 fluidly coupled to corresponding storage vessel 204. In such embodiments, each booster pump 206 is configured to increase or maintain the pressure of the $CO_2$ stream 30 to about 300 psi and subsequently feed the first $CO_2$ stream 40 to the downstream component, such as, at least one fracking pump in the plurality of fracking pumps 208.

In some embodiments, the $CO_2$ stream 30 including the gaseous $CO_2$ phase is supplied to the booster pump 206 during the shutdown stage and the gas pre-cool stage of the $CO_2$ fracking system 200. In some such embodiments, the booster pump 206 is in the stop state, and is configured to allow a flow of the gaseous $CO_2$ phase of the $CO_2$ stream 30 to at least one fracking pump in the plurality of fracking pumps 208 via the plurality of third conduits 216.

In some embodiments, the plurality of fracking pumps 208 is fluidly coupled to the booster pump 206 via the plurality of third conduits 216 and to a wellhead 218 via at least one fourth conduit in the plurality of fourth conduits 220. In some embodiments, at least one third conduit in the plurality of third conduits 216 may include a flow meter configured to measure a quantity of the first $CO_2$ stream 40 being supplied to the downstream component. Further, the at least one third conduit 216 may include an intermediate manifold disposed downstream relative to the flow meter and configured to temporarily collect the first $CO_2$ stream 40 before feeding the first $CO_2$ stream 40 to the plurality of fracking pumps 208. In some embodiments, the intermediate manifold may be configured to receive the first $CO_2$ stream 40 from a plurality of booster pumps (not shown in FIG. 2) and may be further configured to stabilize pressure of the first $CO_2$ stream 40 before feeding the first $CO_2$ stream 40 to the plurality of fracking pumps 208. In some embodiments, the booster pump 206 may be coupled to a blender (not shown in FIG. 2) which may be configured to i) receive the liquid $CO_2$ phase and a proppant (not shown in FIG. 2), and ii) mix the liquid $CO_2$ phase with the proppant to generate a mixture of liquid $CO_2$ and proppant. In such embodiments, the proppant may be obtained from a proppant source (not shown in FIG. 2). In some embodiments, the proppant may be added with other chemicals or additives so as to improve proppant transport, increase viscosity of the $CO_2$, reduce fluid friction, prevent scaling, and address wellbore and downhole behavior. In such embodiments, the blender may maintain a pressure of the mixture of liquid $CO_2$ and proppant in a range from about 200 psi to about 250 psi.

In some embodiments, the plurality of fracking pumps 208 is configured to receive the first $CO_2$ stream 40 from the booster pump 206 through the plurality of third conduits 216. The first $CO_2$ stream 40 supplied to the plurality of fracking pumps 208 may include the gaseous $CO_2$ phase or the liquid $CO_2$ phase depending on the operation state of the $CO_2$ fracking system 200.

In some embodiments, the first $CO_2$ stream 40 including the liquid $CO_2$ phase is supplied to at least some of the plurality of fracking pumps 208 during the liquid-fill stage and the operation stage of the $CO_2$ fracking system 200. During the operation stage, at least some of the fracking pumps in the plurality of fracking pumps 208 are in the start state, and are configured to increase the pressure of the first $CO_2$ stream 40 to about 10000 psi and subsequently feed a second $CO_2$ stream 50 to a downstream component, such as the wellhead 218. In some embodiments, the plurality of fracking pumps 208 may be further coupled to the blender and configured to receive the mixture of liquid $CO_2$ and proppant and increase the pressure of the mixture in a range from 8000 psi to about 12000 psi, such as, 10000 psi and subsequently feed a pressurized mixture to a downstream component, such as the wellhead 218. During the liquid-fill stage, at least some of the fracking pumps in the plurality of fracking pumps 208 are in the stop state, and are configured to allow a flow of the liquid $CO_2$ phase of the second $CO_2$ stream 50 to the wellhead 218 via at least one fourth conduit in the plurality of fourth conduits 220.

In some embodiments, the first $CO_2$ stream 40 including the gaseous $CO_2$ phase is supplied to the plurality of fracking pumps 208 during the shutdown stage and the gas pre-cool stage of the $CO_2$ fracking system 200. In some such embodiments, at least some of the fracking pumps in the plurality of fracking pumps 208 is in the stop state, and is configured to allow a flow of the gaseous $CO_2$ phase of the first $CO_2$ stream 40 to the wellhead 218 via at least one fourth conduit in the plurality of fourth conduits 220.

During operation stage, the wellhead 218 may be configured to feed the second $CO_2$ stream 50 (for example, a pressurized $CO_2$ stream) to the formations (not shown in FIG. 2) to extract oil or gas from such formations. While in other stages, for example, the gas pre-cool stage, the liquid-fill stage, and the shutdown stage of the $CO_2$ fracking system 200, the second $CO_2$ stream 50 (for example, a moderately pressurized $CO_2$ stream) may be recirculated from at least some of the fracking pumps in the plurality of fracking pumps 208 to an intermediate storage vessel (not shown in figures) to pre-condition the recirculated $CO_2$ stream before reusing it in at least some of the fracking pumps in the $CO_2$ fracking system 200.

As mentioned earlier, the control system 210 includes a plurality of phase detectors 228, a plurality of control valves 230, and a controller 232. In some embodiments, the controller 232 is configured to control the $CO_2$ fracking system 200 during one of more operating stages of the $CO_2$ fracking system 200 including i) a gas pre-cool stage, ii) a liquid-fill stage, iii) an operation stage, and iv) a shutdown stage. In some embodiments, the control system 210 is configured to control the plurality of control valves 230 and the $CO_2$ fracking system 200 during each of the aforementioned operating stages of the $CO_2$ fracking system 200.

In some embodiments, the plurality of phase detectors 228 may include at least one of an ultrasound transceiver, a microwave detector, an infrared detector, a coriolis detector, and a radio frequency detector. In some embodiments, at least some of the phase detector in the plurality of phase detectors 228 is an ultrasound transceiver. The plurality of phase detectors 228 may be configured to determine a phase of $CO_2$ in at least one of the $CO_2$ stream incoming into at least one of the storage vessel 204, the booster pump 206, and the fracking pump 208 and the $CO_2$ stream discharged from at least one of the storage vessel 204, the booster pump 206, and the fracking pump 208, and generate a plurality of input signals 234 based on the determined phase. The term "phase" as used in this context means one or more of a liquid $CO_2$, a gaseous $CO_2$, and a solid $CO_2$.

In the embodiment illustrated in FIG. 2, the plurality of phase detectors 228 is disposed proximate to at least one of the first, second, third, and fourth conduits 212, 214, 216, and 220. In one embodiment, the plurality of phase detectors 228 is a plurality of ultrasound transceivers, where each ultrasound transceiver includes a transmitter and a receiver. In certain embodiments, the plurality of phase detectors 228 includes a first set of phase detectors 228a, a first phase detector 228b, a second phase detector 228c, and a second set of phase detectors 228d. In some such embodiments, the first set of phase detectors 228a is disposed upstream relative to the storage vessel 204 and is configured to generate a first set of input signals 234a; the first phase detector 228b is disposed upstream relative to the booster pump 206 and is configured to generate a first input signal 234b; the second phase detector 228c is disposed upstream relative to the plurality of fracking pumps 208 and is configured to generate a third input signal 234c; and the second set of phase detectors 228d is disposed downstream relative to the plurality of fracking pumps 208 and is configured to generate a second set of input signals 234d, based on the determined phase.

During the liquid-fill stage, the plurality of phase detectors 228 may be configured to determine a $CO_2$ phase and communicate the plurality of input signals 234 to the controller 232. During the operation stage, the plurality of phase detectors 228 may be configured to determine a concentration of the gaseous $CO_2$ phase and generate the plurality of input signals 234 representative of the gaseous $CO_2$ phase, to the controller 232. During the shutdown stage, the plurality of phase detectors 228 may be configured to determine a concentration of the liquid $CO_2$ phase and generate the plurality of input signals 234 representative of the liquid $CO_2$ phase, to the controller 232.

In some embodiments, the plurality of control valves 230 is fluidly coupled to at least one of the first, second, and third conduits 212, 214, 216. In certain embodiments, the plurality of control valves 230 includes a first set of control valves 230a, a first control valve 230b, and a second set of control valves 230c. The first set of control valves 230a is disposed downstream relative to the first set of phase detectors 228a and upstream relative to the storage vessel 204, the first control valve 230b is disposed downstream relative to the first phase detector 228b and upstream relative to the booster pump 206, and the second set of control valves 230c is disposed downstream relative to the second phase detector 228c and upstream relative to the plurality of fracking pumps 208.

The controller 232 is communicatively coupled to the plurality of phase detectors 228, the plurality of control valves 230, the booster pump 206, and the plurality of fracking pumps 208, in some embodiments. In some embodiments, the controller 232 is configured to control one or both of i) a flow of the incoming $CO_2$ stream into at least one of the storage vessel 204, the booster pump 206, and at least one of the fracking pump in the plurality of fracking pumps 208, via the plurality of control valves 230 and ii) an operation condition of at least one of the booster pump 206 and at least one pump in the plurality of fracking pumps 208, based on the plurality of input signals 234 received from the plurality of phase detectors 228.

In some embodiments, the controller 232 is configured to process the plurality of input signals 234 to generate a plurality of control signals 236 for controlling the plurality of control valves 230, the booster pump 206, and at least some of the fracking pumps in the plurality of fracking pumps 208, based on the determined phase of the $CO_2$. The processing of the plurality of input signals 234 may be similar to the processing of the input signal 116 as discussed in the embodiment of FIG. 1.

Based on the detected phase of the $CO_2$, the controller 232 is configured to generate one or more of a first set of control signals 236a to control the first set of control valves 230a, a first control signal 236b to control the first control valve 230b, a second control signal 236c to control the booster pump 206, a second set of control signals 236d to control the second set of control valves 230c, and a third set of control signals 236e to control at least some of the plurality of fracking pumps 208.

In some embodiments, during the liquid-fill stage, the controller 232 is configured to perform one or more of i) communicate the first set of control signals 236a to the first set of control valves 230a, the first control signal 236b to the first control valve 230b, and the second set of control signals 236d to the second set of control valves 230c to continue supplying liquid $CO_2$ to the storage vessel 204, the booster pump 206, and the plurality of fracking pumps 208 respectively, ii) communicate at least one of the second control signal 236c to the booster pump 206 and third set of control signals 236e to the plurality of fracking pumps 208 to switch the operating condition from the stop state to the start state, and iii) determine whether to connect the storage vessel 204 to an alternative liquid $CO_2$ source and communicate the first set of control signals 236a to one or more valves in the first set of control valves 230a to connect the storage vessel 204 to the alternative liquid $CO_2$ source.

In some embodiments, during the operation stage, the controller 232 is configured to perform one or more of i) communicate at least one of the second control signal 236c to the booster pump 206 and the third set of control signals 236e to one or more fracking pumps 208 to switch the operating condition of the booster pump 206 and at least one fracking pump in the plurality of fracking pumps 208 from the start state to the stop state ii) determine whether to connect the booster pump 206 or at least some of the fracking pumps in the plurality of fracking pumps 208 to the alternative liquid $CO_2$ source and communicate the first set of control signals 236a to one or more valves in the first set of control valves 230a to connect the storage vessel 204 to the alternative liquid $CO_2$ source.

In some embodiments, during the shutdown stage, the controller 232 is configured to perform one or more of i) generate the first set of control signals 236a to the first set of control valves 230a, the first control signal 236b to the first control valve 230b, and the second set of control signals 236d to the second set of control valves 230c to continue supplying gaseous $CO_2$ to the to the storage vessel 204, the booster pump 206, and the plurality of fracking pumps 208 respectively and ii) determine whether to connect the storage vessel 204 to the alternative gaseous $CO_2$ source, for example, from the plurality of $CO_2$ sources 202, and generate the first set of control signals 236a to one or more valves in the first set of control valves 230a to connect the storage vessel 204 to the alternative gaseous $CO_2$ source.

In one embodiment a method of controlling a $CO_2$ fracking system is presented. The method includes determining a phase of $CO_2$ in at least one of a $CO_2$ stream incoming into a fracking component of a $CO_2$ fracking system and a $CO_2$ stream discharged from the fracking component. The method further includes generating an input signal representative of the $CO_2$ phase, where the determining and generating steps are performed by a phase detector disposed proximate to at least one of an inlet conduit and an outlet conduit of the fracking component. Further, the method includes controlling one or both of i) a flow of an incoming $CO_2$ stream into the fracking component via a control valve fluidly coupled to the fracking component and ii) an operation condition of the fracking component, based on the input signal received from the phase detector, where the controlling step is performed by a controller communicatively coupled to the phase detector, the control valve, and the fracking component.

Figure 3:
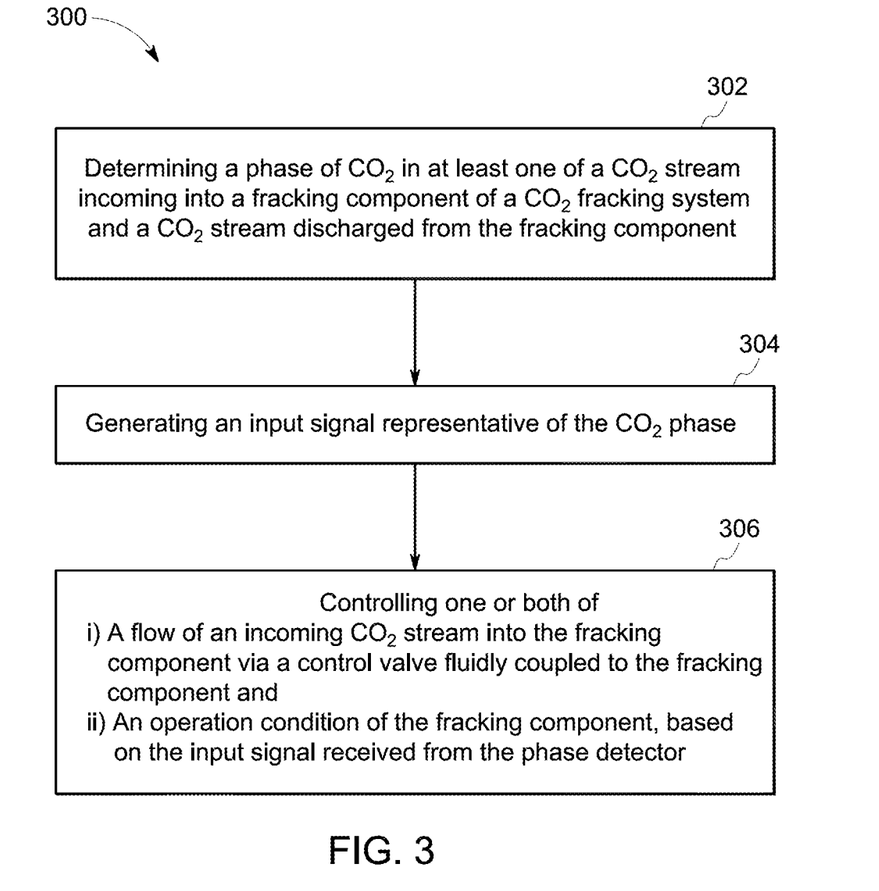
FIG. 3 is a flow chart for a method of controlling a $CO_2$ fracking system including a fracking component, in accordance with one embodiment.

FIG. 3 illustrates a method 300 of controlling a $CO_2$ fracking system (as shown in the embodiments of FIGS. 1 and 2) is disclosed. In one embodiment, the method 300 includes, at step 302, determining a phase of $CO_2$ in at least one of a $CO_2$ stream 10 incoming into a fracking component 102 of a $CO_2$ fracking system 100 and a $CO_2$ stream 12 discharged from the fracking component 102. The term "phase" as used in this context means one or more of a liquid $CO_2$, a gaseous $CO_2$, and a solid $CO_2$.

In one embodiment, the method 300 further includes, at step 304, generating an input signal 116 representative of the $CO_2$ phase. In such embodiments, the determining and generating steps 302, 304 are performed by a phase detector 110 disposed proximate to at least one of an inlet conduit 106 and an outlet conduit 108 of the fracking component 102. In some such embodiments, the fracking component includes at least one of a storage vessel, a booster pump, and a fracking pump. The method further includes a step 306, controlling one or both of i) a flow of an incoming $CO_2$ stream 10 into the fracking component 102 via a control valve 112 fluidly coupled to the fracking component 102 and ii) an operation condition of the fracking component 102, based on the input signal 116 received from the phase detector 110. In some such embodiments, the controlling step 306 is performed by a controller 114 communicatively coupled to the phase detector 110, the control valve 112, and the fracking component 102.

In some embodiments, the determining step 302 includes determining a $CO_2$ phase in at least one of the $CO_2$ stream 10 incoming into the fracking component 102 and the $CO_2$ stream 12 discharged from the fracking component 102 during a liquid-fill stage of the $CO_2$ fracking system 100, and generating the input signal 116 representative of the $CO_2$ phase. In some such embodiments, the controlling step 306 includes performing one or more of (i) continuing the supply of liquid $CO_2$ to the fracking component 102 via the incoming $CO_2$ stream 10, (ii) switching to an operation stage of the $CO_2$ fracking system 100, and (iii) determining whether to connect the fracking component 102 to an alternative liquid $CO_2$ source based on the input signal 116 received from the phase detector 110.

In some embodiments, the determining step 302 includes determining a concentration of a gaseous $CO_2$ phase in at least one of the $CO_2$ stream 10 incoming into the fracking component 102 and the $CO_2$ stream 12 discharged from the fracking component 102 during an operation stage of the $CO_2$ fracking system 100, and generating the input signal 116 representative of the gaseous $CO_2$ phase. In some such embodiments, the controlling step 306 includes performing one or both of i) switching the operating condition of the fracking component 102 from a start state to a stop state and ii) determining whether to connect the fracking component 102 to an alternative liquid $CO_2$ source based on the input signal 116 received from the phase detector 110.

In some other embodiments, the determining step 302 includes determining a concentration of a liquid $CO_2$ phase in at least one of the $CO_2$ stream 10 incoming into the fracking component 102 and the $CO_2$ stream 12 discharged from the fracking component 102 during a shutdown stage of the $CO_2$ fracking system 100, and generating the input signal 116 representative of liquid $CO_2$ phase. In some such embodiments, the controlling step 306 includes performing one or both of i) continuing the supply of gaseous $CO_2$ to the fracking component 102 via the incoming $CO_2$ stream 10 and ii) determining whether to connect the fracking component 102 to an alternative gaseous $CO_2$ source based on the input signal 116 received from the phase detector 110.

In accordance with some embodiments discussed herein, a control system of a $CO_2$ fracking system, provides an automated process of i) determining $CO_2$ phase in a $CO_2$ stream and ii) controlling a flow of the $CO_2$ stream and a operation condition of a fracking component of the $CO_2$ fracking system, based on the determined $CO_2$ phase. In some embodiments, the control system may help to automatically navigate through one or more operation stages of the $CO_2$ fracking system, based on the determined $CO_2$ phase. Further, the control system may overcome a need to have relief valves in the $CO_2$ fracking system to manually observe plumes from such relief valves to determine the $CO_2$ phase, thereby preventing loss of the $CO_2$ stream incurred via the plumes, and possibly preventing health injuries to operators, and damage to the environment.

While only certain features of embodiments have been illustrated and described herein, many modifications and changes will occur to those skilled in the art. It is, therefore, to be understood that the appended claims are intended to cover all such modifications and changes as falling within the spirit of the invention.

What is claimed is:

1. A control system for a $CO_2$ fracking system comprising a fracking component, the control system comprising:
   a phase detector disposed proximate to at least one of an inlet conduit and an outlet conduit of the fracking component;
   a control valve fluidly coupled to the inlet conduit of the fracking component; and
   a controller communicatively coupled to the phase detector, the control valve, and the fracking component,
   wherein the phase detector is configured to determine a phase of $CO_2$ in at least one of a $CO_2$ stream incoming into the fracking component and a $CO_2$ stream discharged from the fracking component, and to generate an input signal based on the determined phase, and
   wherein the controller is configured to control one or both of i) a flow of the incoming $CO_2$ stream into the fracking component via the control valve and ii) an operation condition of the fracking component, based on the input signal received from the phase detector.

2. The control system of claim 1, wherein the fracking component comprises at least one of a storage vessel, a booster pump, and a fracking pump.

3. The control system of claim 1, wherein the phase detector is configured to determine a $CO_2$ phase in at least one of the $CO_2$ stream incoming into the fracking component and the $CO_2$ stream discharged from the fracking component during a liquid-fill stage of the $CO_2$ fracking system, and to generate the input signal representative of the $CO_2$ phase.

4. The control system of claim 3, wherein the controller is configured to perform one or more of (i) continue supplying liquid $CO_2$ to the fracking component via the incoming $CO_2$ stream, (ii) switch to an operation stage of the $CO_2$ fracking system, and (iii) determine whether to connect the fracking component to an alternative liquid $CO_2$ source based on the input signal received from the phase detector.

5. The control system of claim 1, wherein the phase detector is configured to determine a concentration of a gaseous $CO_2$ phase in at least one of the $CO_2$ stream incoming into the fracking component and the $CO_2$ stream discharged from the fracking component during an operation stage of the $CO_2$ fracking system, and to generate the input signal representative of the gaseous $CO_2$ phase.

6. The control system of claim 5, wherein the controller is configured to perform one or both of i) switch the operation condition of the fracking component from a start state to a stop state and ii) determine whether to connect the fracking component to an alternative liquid $CO_2$ source based on the input signal received from the phase detector.

7. The control system of claim 1, wherein the phase detector is configured to determine a concentration of a liquid $CO_2$ phase in at least one of the $CO_2$ stream incoming into the fracking component and the $CO_2$ stream discharged from the fracking component during a shutdown stage of the $CO_2$ fracking system, and to generate the input signal representative of the liquid $CO_2$ phase.

8. The control system of claim 7, wherein the controller is configured to perform one or both of i) continue supplying gaseous $CO_2$ to the fracking component via the incoming $CO_2$ stream and ii) determine whether to connect the fracking component to an alternative gaseous $CO_2$ source based on the input signal received from the phase detector.

9. The control system of claim 1, wherein the phase detector comprises at least one of an ultrasound transceiver, a microwave detector, an infrared detector, a coriolis detector, and a radio frequency detector.

10. The control system of claim 1, wherein the phase detector comprises an ultrasound transceiver.

11. A $CO_2$ fracking system, comprising:
    a storage vessel fluidly coupled to a $CO_2$ source through a first conduit;
    a booster pump fluidly coupled to the storage vessel through a second conduit;

a fracking pump fluidly coupled to the booster pump via a third conduit and to a wellhead via a fourth conduit; and a control system configured to control the $CO_2$ fracking system, wherein the control system comprises:
  a phase detector disposed proximate to at least one of the first, second, third, and fourth conduits;
  a control valve fluidly coupled to at least one of the first, second, and third conduits; and
  a controller communicatively coupled to the phase detector, the control valve, the booster pump, and the fracking pump,
  wherein the phase detector is configured to determine a phase of $CO_2$ in at least one of a $CO_2$ stream incoming into the at least one of the storage vessel, the booster pump, and the fracking pump and a $CO_2$ stream discharged from at least one of the storage vessel, the booster pump, and the fracking pump, and to generate an input signal based on the determined phase, and
  wherein the controller is configured to control one or both of i) a flow of an incoming $CO_2$ stream into at least one of the storage vessel, the booster pump, and the fracking pump, via the control valve and ii) an operation condition of at least one of the booster pump and the fracking pump, based on the input signal received from the phase detector.

12. The $CO_2$ fracking system of claim 11, wherein the controller is configured to control the $CO_2$ fracking system during at least one or more operating stages of the $CO_2$ fracking system comprising i) a gas pre-cool stage, ii) a liquid-fill stage, iii) an operation stage, and iv) a shutdown stage.

13. The $CO_2$ fracking system of claim 11, wherein the phase detector comprises an ultrasound transceiver.

14. The $CO_2$ fracking system of claim 11, wherein the phase detector comprises at least one of an ultrasound transceiver, a microwave detector, an infrared detector, a coriolis detector, and a radio frequency detector.

15. A method comprising:
  determining a phase of $CO_2$ in at least one of a $CO_2$ stream incoming into a fracking component of a $CO_2$ fracking system and a $CO_2$ stream discharged from the fracking component;
  generating an input signal representative of the $CO_2$ phase, wherein the determining and generating steps are performed by a phase detector disposed proximate to at least one of an inlet conduit and an outlet conduit of the fracking component; and
  controlling one or both of i) a flow of an incoming $CO_2$ stream into the fracking component via a control valve fluidly coupled to the fracking component and ii) an operation condition of the fracking component, based on the input signal received from the phase detector, wherein the controlling step is performed by a controller communicatively coupled to the phase detector, the control valve, and the fracking component.

16. The method of claim 15, wherein the fracking component comprises at least one of a storage vessel, a booster pump, and a fracking pump.

17. The method of claim 15, wherein the determining step comprises determining a $CO_2$ phase in at least one of the $CO_2$ stream incoming into the fracking component and the $CO_2$ stream discharged from the fracking component during a liquid-fill stage of the $CO_2$ fracking system, and generating the input signal representative of the $CO_2$ phase.

18. The method of claim 17, wherein the controlling step comprises performing one or more of (i) continuing supply of liquid $CO_2$ to the fracking component via the incoming $CO_2$ stream, (ii) switching to an operation stage of the $CO_2$ fracking system, and (iii) determining whether to connect the fracking component to an alternative liquid $CO_2$ source, based on the input signal received from the phase detector.

19. The method of claim 15, wherein the determining step comprises determining a concentration of a gaseous $CO_2$ phase in at least one of the $CO_2$ stream incoming into the fracking component and the $CO_2$ stream discharged from the fracking component during an operation stage of the $CO_2$ fracking system, and generating the input signal representative of the gaseous $CO_2$ phase.

20. The method of claim 19, wherein the controlling step comprises performing one or both of i) switching the operation condition of the fracking component from a start state to a stop state and ii) determining whether to connect the fracking component to an alternative liquid $CO_2$ source based on the input signal received from the phase detector.

21. The method of claim 15, wherein the determining step comprises determining a concentration of a liquid $CO_2$ phase in at least one of the $CO_2$ stream incoming into the fracking component and the $CO_2$ stream discharged from the fracking component during a shutdown stage of the $CO_2$ fracking system, and generating the input signal representative of the liquid $CO_2$ phase.

22. The method of claim 21, wherein the controlling step comprises performing one or both of i) continuing supply of gaseous $CO_2$ to the fracking component via the incoming $CO_2$ stream and ii) determining whether to connect the fracking component to an alternative gaseous $CO_2$ source based on the input signal received from the phase detector.

* * * * *